US005648914A

United States Patent [19]

Bauer et al.

[11] Patent Number: 5,648,914

[45] Date of Patent: Jul. 15, 1997

[54] METHOD OF DEFENDING AGAINST CHEMICAL AND BIOLOGICAL MUNITIONS

[75] Inventors: Timothy J. Bauer, Great Mills, Md.; Roger L. Gibbs, Dahlgren; Paul R. Kirk, Fredericksburg, both of Va.

[73] Assignee: The United States of America as represented by the Secretary of the Navy, Washington, D.C.

[21] Appl. No.: 906,390

[22] Filed: Jun. 30, 1992

[51] Int. Cl.$^{6}$ .................................................. G06F 17/00

[52] U.S. Cl. ........................................ 364/496; 364/420

[58] Field of Search ................................ 364/420, 496, 364/499, 578, 423; 340/632

[56] References Cited

U.S. PATENT DOCUMENTS

| | | | |
|---|---|---|---|
| 3,736,411 | 5/1973 | Berndt | 364/423 |
| 4,218,755 | 8/1980 | Root | 364/900 |
| 4,817,039 | 3/1989 | Frost | 364/420 |
| 4,827,414 | 5/1989 | Christianson et al. | 364/423 |
| 4,933,669 | 6/1990 | Lyons | 340/632 |

OTHER PUBLICATIONS

Saucier, Richard, "NUSSE3 Model Description,"*Chemical Research, Development, & Engineering Center*, May 1987, all.

Van der Hoven, "Meteoroligical Consideration in the Development of a Real–Time Atmospheric Dispersion Model for Reactor Efficient Exposure Pathway, " May 1982, NUREG/CR–2584.

Jury, Mark R., "Real–Time Evaluation and Prediction of Coastal Dispersion Near the SW Tip of Africa," *ESA, Mesogeale Analysis and Forcasting,* 1987, pp. 471–474.

*Atmospheric Emergencies: Existing Capabilities and Future Needs,* Transportation Research Brand, 1983.

NSWC TR 89–347. Nov. 1989, by Timothy J. Bauer.

*Primary Examiner*—Ellis B. Ramirez
*Assistant Examiner*—Eric W. B. Stamber
*Attorney, Agent, or Firm*—James B. Bechtel, Esq.

[57] ABSTRACT

A method of defending against toxic munitions which release airborne toxic materials is provided. The method includes the steps of detecting the physical properties of the airborne toxic material, detecting the physical properties of the munition, reading meteorological conditions at the location of the airborne toxic material, predicting the dispersion of the toxic munition, and modelling the predicted dispersion on a display monitor of a computer. The method also predicts the dispersion of an airborne toxic material at a known location.

4 Claims, 2 Drawing Sheets

METHOD OF DEFENDING AGAINST CHEMICAL AND BIOLOGICAL MUNITIONS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The present invention relates generally to a method of defending against munition attacks and more specifically to a method of defending against an attack involving an airborne chemical or biological munition.

BACKGROUND OF THE INVENTION

Methods for defending against an atmospheric release of chemical or biological munitions are still a new and developing art. The prior art includes other methods to detect and assess damage during warfare. For example, Christianson et al. in U.S. Pat. No. 4,827,414 disclose a method for detecting a nuclear weapon explosion and for assessing damage caused by the explosion. The system comprises a sensor head for detecting predetermined signals which are characteristic of different nuclear explosions and an electronic signal processor connected to the sensor head for processing the detected signals. These processed signals provide thermonuclear blast data of the nuclear explosion.

The United States Army Chemical Research, Development and Engineering Center has also developed tracking methods, an example of which may be found in a computer program entitled Non-Uniform Simple Surface Evaporation, Version 4 (NUSSE4). The NUSSE4 computer program performs some of the required computations in estimating the dispersion of chemical munitions. These computations include detailed meteorological condition estimation of the Monin-Obukov length, surface roughness, length and friction velocity, Lagrangian time scale and turbulence intensities, rate of cloud expansion with time, droplet shape and terminal velocity, and droplet Sherwood number. NUSSE4 also computes wind profile and estimates ground temperature.

NUSSE4 has drawbacks in actual operation. The program input requires the user to have extensive knowledge of chemical agent and munition parameters. Output is in tabular form which requires further processing to obtain meaningful results. NUSSE4 is also incapable of reading meteorological conditions and provides estimations on the dispersion of only chemical munitions. NUSSE4 also cannot be used on personal computers.

SUMMARY OF THE INVENTION

An object of the present invention is to provide downwind toxic hazard assessments for atmospheric release of chemical and biological munitions resulting from an enemy military attack.

Another object of the present invention is to provide a method of defending against a chemical or biological munitions attack providing real-time dispersion estimates.

A further object of the present invention is to provide a method of defending against both a chemical or a biological munitions attack which is suitable for adaptation to microcomputers.

Yet another object of the present invention is to provide a method of predicting the dispersion of an airborne toxic material that accounts for changing meteorological conditions.

A further object of the present invention is to provide a method of predicting the dispersion of airborne toxic materials that is simple to use.

The present invention attains the foregoing and additional objects by providing a method of defending against chemical and biological munitions. The method comprises the steps of detecting the physical properties of the airborne toxic material, detecting the physical properties of the munition, reading meteorological conditions at the release location, predicting dispersion of the airborne toxic material by modelling both the transport and the diffusion of the material, and representing the modelled transport and diffusion on a display monitor of a computer. The meteorological conditions include time of day, temperature, wind speed, wind direction, cloud cover and air turbulence. The method also updates a daytime orientation of dawn, day, dusk or night. A more detailed methodology uses positional latitude and longitude and day of the year to estimate transport and diffusion parameters. The steps of reading meteorological conditions and predicting the dispersion of the airborne toxic material are repeated as desired to give updated representations of the modelled transport and diffusion. The representations of the modelled transport and diffusion include a two-dimensional hazard footprint which discloses liquid deposition, liquid persistence, and vapor dosage of the airborne toxic material.

The method of the present invention may also simply predict the dispersion of an airborne toxic material. In this embodiment, the method selects the physical properties of the airborne toxic material and reads meteorological conditions at the location of the material. The method then models the transport and diffusion of the airborne toxic material and represents this model on a display monitor of a personal computer. Again, the meteorological conditions include time of day, temperature, wind speed, wind direction, cloud cover and air turbulence. This method also updates a daytime orientation of dawn, day, dusk, or night.

BRIEF DESCRIPTION OF THE DRAWINGS

The numerous advantages of the present invention will be more fully appreciated from the detailed description when read with reference to the appended drawings wherein.

DETAILED DESCRIPTION OF THE INVENTION

Figure 1:
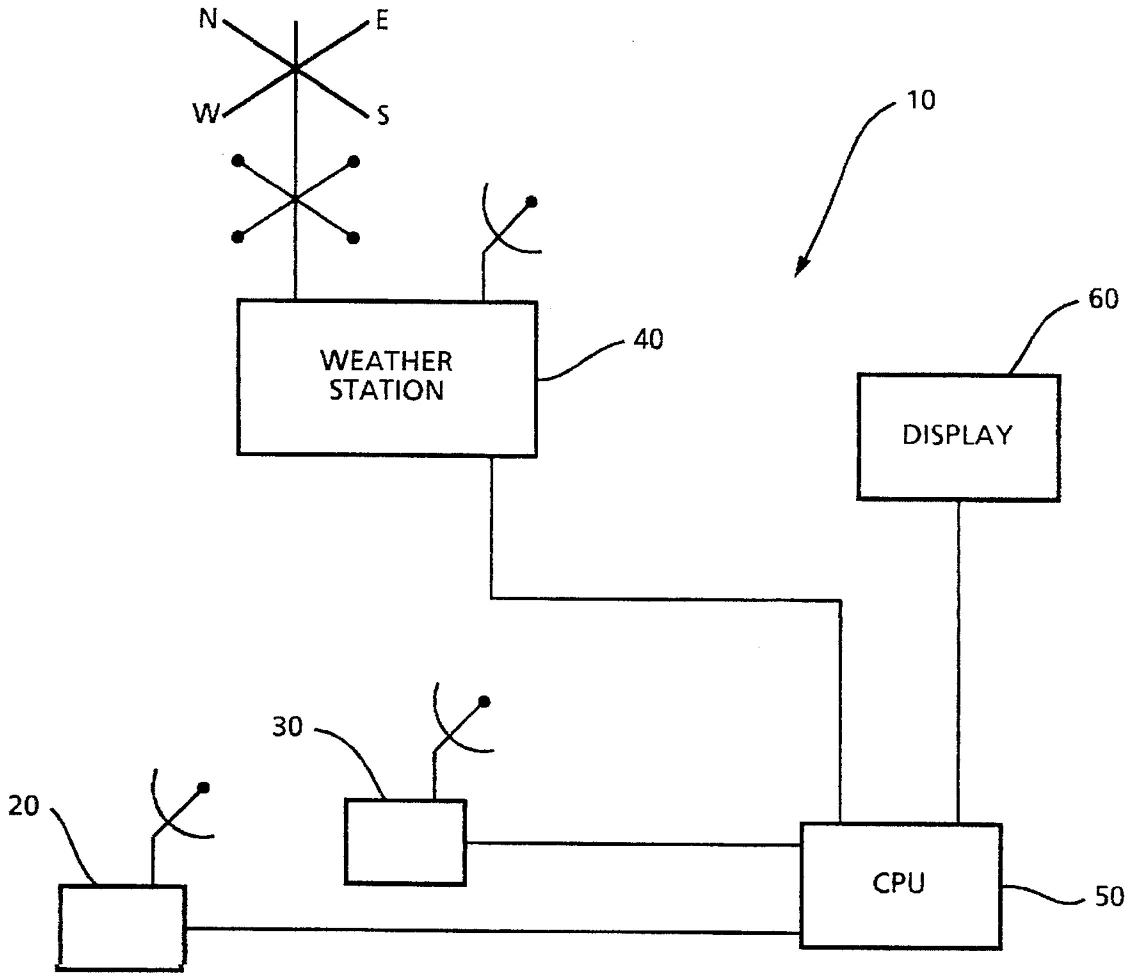
FIG. 1 is a block diagram showing a system using the method of defending against a toxic munition of the present invention.

Referring now to FIG. 1, a schematic diagram shows a system 10 using a method of defending against a toxic munition of the present invention. The system 10 comprises a sensor 20 for detecting the physical properties of the toxic airborne material, a sensor 30 for detecting the physical properties of the munition, a weather station 40 for reading meteorological conditions at the release location, a central processing unit 50 for predicting the dispersion of the airborne toxic material by a computer model, and a display monitor 60 for representing the modelled dispersion.

Figure 2:
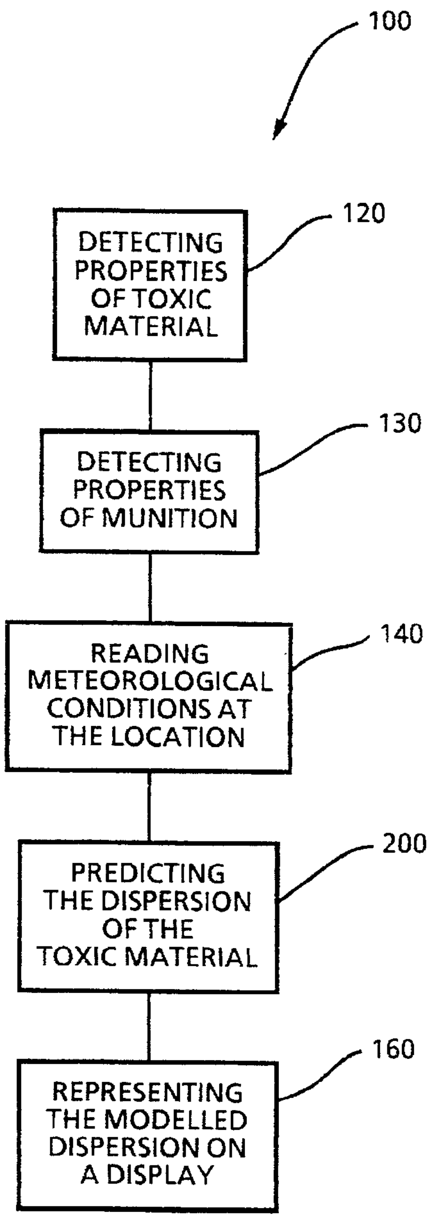
FIG. 2 is a flowchart of the method of defending against a toxic munition of the present invention.

FIG. 2 shows a flowchart 100 for the steps of the method which system 10 uses for defending against a toxic munition. The method comprises the step 120 of detecting the physical properties of the toxic material, the step 130 of detecting the physical properties of the munition, the step 140 of reading meteorological conditions at the release location, the step 200 of predicting the dispersion of the airborne toxic material by a computer model, and the step 160 of representing the modelled dispersion on the display monitor 60.

Figure 3:
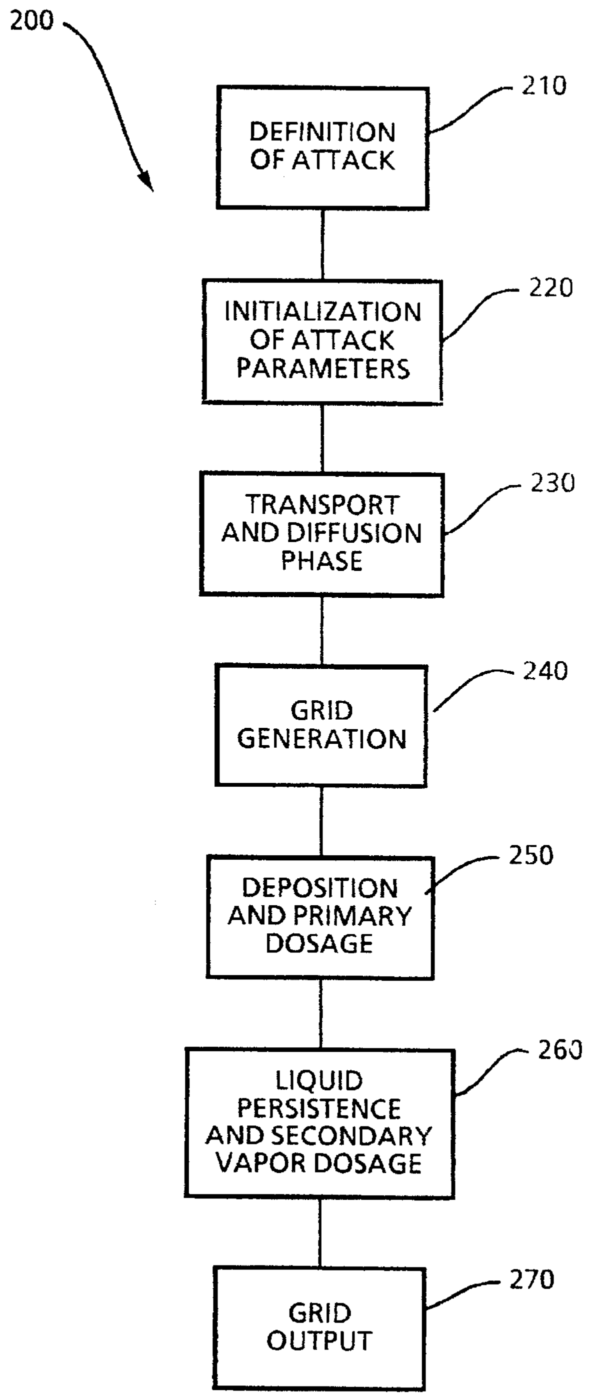
FIG. 3 is a flow chart of a computer program used for predicting the dispersion of a toxic material.

FIG. 3 illustrates a flowchart for a computer program which the system 10 uses for the step 200 of predicting the dispersion of an airborne toxic material. The invention provides a real-time capability to defend against chemical or biological warfare during attack and before dispersion occurs. The computer program, entitled VLSTRACK, comprises seven main functions—definition of attack 210, initialization of attack parameters 220, prediction of transport and diffusion 230, grid generation 240, prediction of deposition and primary dosage 250, prediction of liquid persistence and secondary vapor dosage 260, and grid output 270.

The step of predicting the dispersion of a toxic material by computer model 50 begins by defining the input parameters of the method for defending against a toxic munition during an enemy attack. Definition of attack parameters 210 comprises reading the physical properties and names of the chemical or biological toxic material or agent data file and reading the classifications of the munition data file, which are named VLSAGN.DAT and VLSMUN.DAT, respectively. If an input parameter file named VLSTRACK.DAT exists all parameter values are read. Otherwise, parameters are assigned default values. The input parameter file VLSTRACK.DAT is then rewritten to reflect all changes made to the input parameter values. The program then displays the first input menu defining the conditions of the attack. The program interacts with this menu by selecting options until the chemical/biological attack has been defined completely. To facilitate use of this menu, VLSTRACK displays only the options relevant to the chemical/biological agent-munition combinations currently selected. The menu safeguards against input of parameter values too large or small for meaningful computations. Further, parameters linked to an input whose value has just been changed are monitored to maintain consistency during the definition of attack.

Because meteorological conditions change as the agent attack moves from day to night or night to day, the next input after agent specification is the definition of start times of dawn, day, dusk, or night. After the chemical/biological attack and daytime orientation have successfully been defined, the program continues to an input menu for meteorological conditions. This menu contains parameter values for the wind and air properties and the time of day using the 24-hour military clock. The menu displays only those parameters which will be used for computations. As with the attack menu, this menu also contains safeguards with parameter couplings to maintain meteorological conditions relevant to the chemical or biological attack.

The definition of attack 210 allows for periodic change of meteorological conditions during the attack. Changing meteorological conditions are most important for predicting the secondary vapor generated by persistent chemical agents and for predicting any biological agent releases. Conditions which change as the chemical or biological agent moves downwind can be input and updated either interactively or by using an input file. For interactive input, a meteorological condition update menu will appear at the end of each time period. On the other hand, the method of using the input file enables periodic forecasts of meteorological conditions. The program's output will then correspond to the current forecast. Meteorological conditions at the position of the agent rather than at the initial point of release are required for each input time. Because VLSTRACK does not attempt any meteorological forecasting, it must allow for some change in downwind position. Generally, chemical attacks require less than an hour for the droplets of the toxic material to impact the ground and for the primary vapor to dissipate.

Following completion of the menu for input of meteorological conditions, another menu allows for changing the grid size of the output 270 up to a size of 101 by 101 grid points. A grid size of sixty-one downwind points by nineteen crosswind points will fill an eighty column by twenty-five line display screen. More grid points result in a higher resolution output, yet have the expense of longer run times. A high resolution grid, however, can create a graphical output with sophisticated contour plotting routines.

After defining the output grid size, the program adjusts four hazard levels which are represented on the character screen graphics. The program also specifically names output, grid, and meteorology data files or selects the default names of VLSTRACK.OUT, VLSGRD.DAT, and VLSMET.DAT, respectively. The output file VLSTRACK.OUT includes a summary of all relevant input parameters. An output mode with this menu may also be chosen.

The next step in the prediction of the dispersion is the initialization of attack parameters 220. The program may designate a file different from the VLSTRACK.MET default file for input or output of meteorological records. During initialization of attack parameters 220, VLSTRACK computes first the surface roughness length, Monin-Obukov length, and Pasquill stability category. The program then computes the friction, velocity, mixing layer height, Lagrangian time scales, and turbulence intensities. Values for the Lagrangian time scales and turbulence intensities are computed both above and below the mixing layer height. VLSTRACK will also allow for a random wind meander with a near-zero wind velocity input.

The next step during initialization of attack parameters 220 involves reading the chemical/biological agent and munition parameter values from input files VLSAGN.DAT and VLSMUN.DAT, respectively. The program calculates a minimum concentration value from the median lethal dosage of the chemical or biological agent to determine how far downwind the program should track the airborne clouds and to size an output grid for the resulting hazard. If the munition detected has a two-agent mixture, the program calculates an output for the chosen component. VLSTRACK treats the two chemical agents in a binary fill as having negligible chemical interaction so that each evaporates independently of the other. This assumption is valid when one of the chemical agents is much more volatile than the other and it evaporates quickly from the droplets or when both chemical agents are immiscible. The assumption is also valid for highly miscible chemical agents when the chemical background vapor concentration is well below saturation. For two-agent mixtures which may arise during a chemical attack, these assumptions should not lead to significant error. While the program will account for inert component fractions when the agent fractions add up to less than unity, it will not accommodate volatility or reaction factors due to inert components.

The initialization of attack parameters 220 requires defining the initial vapor, liquid, and solid clouds of toxic material. To define these clouds, VLSTRACK computes the liquid or solid mass effectively disseminated and the mass evaporated by detonation of the toxic munition. While the volatility of a chemical agent controls its evaporation, no evaporation occurs for biological agents because they are either solid material or involatile toxins. Further, although biological agents are disseminated in either a dry form or from a wet slurry, VLSTRACK ignores modelling water droplets and filler material and instead considers only the biological agent. VLSTRACK thus predicts a concentration at a position inside of each vapor, liquid, or solid cloud by using a trivariate Gaussian distribution equation having single partial reflection terms from the ground and from the mixing layer height given as:

$$C=\frac{Q_c}{(2\pi)^{3/2}\sigma_x\sigma_y\sigma_z}\exp\left[-\frac{(x-x_c)^2}{2\sigma_x^2}\right]\exp\left[-\frac{(y-y_c)^2}{2\sigma_y^2}\right]\times\left\{\exp\left[-\frac{(z-z_c)^2}{2\sigma_z^2}\right]+f_g\exp\left[-\frac{(z+z_c)^2}{2\sigma_z^2}\right]+f_m\exp\left[-\frac{(2z_m-z-z_c)^2}{2\sigma_z^2}\right]\right\}$$

where, $C$=Concentration $Q_c$=chemical/biological agent mass of cloud $\sigma_x$=downwind cloud sigma $\sigma_y$=crosswind cloud sigma $\sigma_z$=vertical sigma $x$=downwind position inside cloud $x_c$=downwind position of cloud center $y$=crosswind position inside cloud $y_c$=crosswind position of cloud center $z$=height above the ground inside the cloud $z_c$=height above the ground of cloud center $f_g$=fraction of cloud mass reaching the ground reflected back into the cloud $f_m$=fraction of cloud mass reaching the mixing layer reflected back into the cloud $z_m$=height above the ground of the mixing layer.

If the chemical or biological agent disperses as a line source or plume, the program represents the agent as a series of overlapping point sources, each having an equal fraction of the vapor, liquid, and solid mass. This approximation of point sources enables application of a vertical wind velocity profile for transport computations. The wind velocity profile causes dispersion of a chemical or biological agent close to the ground to travel at a slower speed than an agent at higher elevations. The program thus computes the shearing of vertical line sources and the shearing effect for each point source near the ground.

The program then further divides the liquid or solid mass of each point source into droplet or particle size categories according to a lognormal size distribution. If multiple munitions are used in the attack, detonation coordinates are generated using either a Gaussian random number generator or a uniform random number generator, depending on the method chosen. The dispersion time for each munition is also computed from the detected rate of fire. The program assumes that all munitions in a multiple munitions attack detonate at the same height, but this assumption requires either impact or altitude fuzing. Time delay fuzing will lead to a vertical release height distribution which VLSTRACK does not handle. At this point, the initial dispersions of the chemical or biological agents have been divided into individual munitions, line sources or plumes divided into point sources, each point source separated into vapor, liquid and solid clouds, and liquid or solid mass divided into clouds by droplet or particle size category. Each of these clouds will be tracked with time until it either dissipates, evaporates, or deposits on the ground.

The prediction of transport and diffusion 230 is the next function of VLSTRACK. Because each individual munition in a multiple munitions attack functions at the same height, each has the same transport and diffusion behavior. Likewise, the point sources approximating a single horizontal line source or plume will have identical behavior. For these cases, the multiple point source effects are added together in the deposition, persistence, and dosage computational phases following the transport and diffusion phase. All other clouds from the point sources and from the droplet or particle sizes must be tracked with each time step. The time step is initially two seconds and increases with time as the size of the clouds increases until it equals one minute after the first hour of transport and diffusion phase. The program defines each vapor cloud by mass, height above the ground, downwind position, crosswind position, horizontal sigma, and vertical sigma. The last four of these properties will change with time for neutrally-buoyant vapor clouds. The height above the ground will also change with time for dense or heavier-than-air vapor clouds. The program further defines each liquid or solid cloud by droplet or particle mass, droplet or particle diameter, number of droplets or particles, height above ground, downwind position, crosswind position, horizontal sigma, and vertical sigma. All of these properties except number of droplets will change with time for liquid clouds. Particle mass, particle diameter, and number of particles will remain unchanged for solid or involatile clouds.

At the beginning of each time step, including initially, the program computes the concentration of chemical agent vapor, of biological agent mass, or of dusty agent liquid and/or vapor at the specified output height of interest for output in the form of dosage. If the computation results in a concentration above the minimum value previously determined, the cloud properties are written to an intermediate output file, VLSREC.TMP. For persistent chemical agents, the properties of all liquid or solid clouds which have deposited on the ground are written to VLSDEP.TMP. Area concentrations are computed for all deposited clouds.

The local military time is updated for each time step. If a biological agent is used, the exponential decay rate is also adjusted for different times of day. When a cloud is close to the ground a wind velocity gradient occurs vertically within the cloud. This gradient will smear the cloud in the downwind direction more rapidly than by diffusion alone. The importance of this smearing becomes even greater when the wind changes direction. Therefore, the program tracks positions above and below the release height to adjust the horizontal sigmas in the downwind and crosswind directions. As a result, even though diffusion will occur uniformly horizontally, the smearing factor will lead to different downwind and crosswind cloud sigmas. For both neutrally buoyant and dense vapor clouds, the program adjusts both the downwind and crosswind positions and the cloud expansion sigmas.

Computations for dense vapor clouds are based on a 1989 Naval Surface Warfare Center study of dense vapor cloud formation via release of highly volatile chemical agents from existing chemical munitions and the subsequent diffusion and transport of the clouds. This report is incorporated herein by reference. The partial differential diffusion equation in horizontal position and vertical position with time was solved by finite difference to predict the stability of the clouds. Computations in VLSTRACK estimate the effective mass of the cloud, which is the sum of increased mass and lowered temperature. The rate of entrainment of air surrounding the cloud versus its gravitational acceleration is then determined at each time step. The terminal velocity of the cloud is adjusted by a sum of these competing factors, this sum being multiplied by an adjacent ratio determined through comparison with results from the above study. The terminal velocity then determines the height of the cloud center at the end of the time step. Because a vapor cloud will always remain above the ground, the cloud center is not allowed to fall below 0.5 meters. Increases in density resulting from explosive dispersion of a chemical agent will be on the order of two percent of ambient air density or less. The familiar cloud slumping and enhanced cloud stability which can occur with density increases greater than fifty percent of ambient air density will not likely occur during a military chemical attack. This semi-empirical approach works sufficiently well for the small, dense-vapor cloud effects resulting from the explosive dispersions characteristic of chemical munitions.

The program determines the terminal velocity of a droplet or a particle by balancing its gravitational acceleration and air drag. Liquid or solid cloud height is then adjusted for the time step. Cloud sigmas for clouds containing droplets or particles do not increase as quickly as those for vapor clouds due to the inertia of the droplets or particles. The program uses the same droplet diffusion factor adjustment as used in NUSSE4 for liquid and solid clouds. For both liquid and solid clouds, downwind position and crosswind position and cloud expansion sigmas are adjusted.

Droplets of a persistent chemical agent also evaporate as they fall. The potential rate of evaporation is determined by the Sherwood number which is a function of the droplet terminal velocity. This potential rate of evaporation is attenuated by the difference between the volatility of the chemical agent and the chemical agent vapor concentration surrounding the droplet. Thus, for each liquid cloud, the chemical agent concentration from all nearby vapor clouds must be summed up at the liquid cloud position to determine this background concentration. These computations are CPU intensive but must be performed at least for the vapor formed by the burst and for a short period afterwards when the evaporative driving force will be greatest. Otherwise, the mass of liquid evaporated may be greatly overestimated, especially for small droplets which take longer to reach the ground.

The mass of vapor formed when the liquid cloud evaporates creates a new cloud if the concentration exceeds the minimum. The program assigns this new vapor cloud a downwind position and a crosswind position and cloud sigmas at the end of the time step of the liquid cloud which generated this vapor cloud. The height of the center of the vapor cloud is the average height of that liquid cloud during the time interval.

Transport and diffusion computations continue either until the end of the meteorological condition time period or until all liquid clouds have either dissipated, evaporated, or deposited on the ground and all vapor clouds have also dissipated.

Following the prediction of transport and diffusion 230 for each meteorological condition time period, the computer program performs grid generation 240 and generates an output grid which is sized to the chemical or biological agent. Because dimensions of the hazard will increase with time, the output grid must also increase in dimension with time. Also, as the wind direction changes, the grid may require a lateral shift. The minimum and maximum agent extensions in the downwind and crosswind directions are computed during the prediction of transport and diffusion 230, when the intermediate output files are updated. The grid generating method in VLSTRACK starts with a grid spacing of 6.25 meters and increases by factors of 2 up to a grid spacing of 12.8 kilometers. When the hazard becomes too large to fit on the existing grid, the dimensions of the grid are doubled while retaining the same number of grid points. The program sizes the downwind and crosswind directions independently and, thereby, maximizes the number of grid values which can be directly transferred to the larger grid. For example, a grid point corresponding to 25 meters downwind and 12.5 meters crosswind with 12.5 meters and 6.25 meters grid spacings, respectively, will be mapped onto the same distances for 25 meters and 12.5 meters grid spacings. The output grid generated for the first time period is oriented with the downwind direction moving across screen columns and the crosswind direction moving across screen lines. The output grid retains this orientation for all time periods even though the wind direction may change.

The next function of VLSTRACK is prediction of the deposition and primary dosage 250. Computations of deposition for persistent or dusty chemical agents or biological agents read the deposited liquid cloud data records from the intermediate file VLSDEP.TMP. A bivariate Gaussian distribution equation, as given below, determines the deposition in mg/m$^2$ from each record at each grid point:

$$D=\frac{Q_c}{2\pi\,\sigma_x\sigma_y}\exp\left[-\frac{(x-x_c)^2}{2\sigma_x^2}\right]\exp\left[-\frac{(y-y_c)^2}{2\sigma_y^2}\right]$$

where,

D=deposition.

For the cases of multiple munitions or horizontal line sources or plumes, each point source contributes this deposition relative to its dispersion point, thereby requiring each data record to be looped on all point sources. If computations for liquid persistence or secondary vapor dosage are required, then the computer determines the average droplet size in microns and the average deposition time in seconds. These two values use a weighted sum based on the mass deposited for each droplet size from each cloud. The earliest and latest deposition times and the total mass deposited on the entire grid are also computed. If a sampler has been designated, any deposition which reaches the sampler is given as a function of time.

Primary dosage gives a measure of the exposure of chemical/biological agent before deposition on the ground and includes the exposure resulting from neutrally buoyant or dense vapor clouds, dusty agent clouds, and biological agent clouds. Cloud properties are read from intermediate files VLSREC.TMP. A trivariate Gaussian distribution equation determines the concentration in mg/m$^3$ at each grid point from each record. As with the computations for deposition, each record must be looped on each point source relative to its dispersion point for multiple munitions, horizontal line sources, or plumes. The concentration from each data record at each grid point is multiplied by the time step in minutes to give dosage values in mg-min/m$^3$. These values are then converted to the number of $LCT_{50}$'s by dividing the chemical/biological agent inhalation lethality. The earliest and latest dosage times are also calculated. If a sampler has been designated, any chemical/biological agent which reaches the sampler is given in terms of $LCT_{50}$'s or mg-min/m$^3$.

The computer program next calculates liquid persistence and secondary vapor dosage 260. Predicting the evaporation of a liquid after it has been deposited on the ground is not as easy as simply summing up contributions, which is the approach used for deposition and primary dosage. Instead, when a droplet deposits on the ground surface, gravity forces the droplet to spread to a size larger than its spherical diameter. This deposition at each grid point is in terms of mg/m$^2$ of liquid chemical agent. By assuming this deposition is uniform across a rectangular area represented by downwind and crosswind grid spacing, the droplet diameter, spread factor, and deposition level determine the fraction of each grid region covered by a liquid chemical agent as follows:

$$A = \frac{3\,Q_G^2\gamma^2}{2p_D d}$$

where,

A=fraction of grid region covered by droplets $Q_G$=deposition level in grid region γ=droplet spread factor $P_D$=chemical agent liquid density d=droplet diameter.

As with evaporation of a falling droplet, droplets deposited on the ground have a potential rate of evaporation. The wind moves along the ground surface and removes any chemical agent vapor generated by droplet evaporation. A Sherwood number can be estimated for this evaporation using the wind velocity and the length of the grid region in the wind direction. A theoretical derivation of turbulent mass transfer for flow over a flat surface provides this Sherwood number:

$$Sh = 0.0365\,Re^{0.8}\,Sc^{0.62}$$

$$Re = \frac{\rho_A u L}{\mu A} \qquad Sc = \frac{\mu A}{\rho_A \delta_D}$$

where,

Sh=Sherwood number

Re=Reynold's number

Sc=Schmidt number $\rho_A$=air density u=wind velocity near the ground

L=grid region length in wind direction $\mu_A$=air viscosity $\delta_D$=chemical agent vapor diffusivity through air. This potential rate of evaporation is attenuated by the difference between the chemical agent volatility and the chemical agent vapor concentration at the ground surface. The program assumes the droplets are at ground temperature, although the ground temperature is often different from the temperature of the air above. During the night, the ground radiates and cools more rapidly than the air does. Thus, under stable conditions, the ground will be cooler than the air. During the day, the ground absorbs radiation from the sun and heats up faster than the air so that, again under unstable conditions, the ground will be warmer than the air. The program therefore updates ground temperature as meteorological conditions change.

As with droplet evaporation during transport and diffusion, the chemical agent vapor concentration must be calculated as the sum of the contributions from all secondary vapor clouds at the grid point. The program assigns a new secondary vapor cloud to vapor generated by droplet evaporation if the vapor's concentration exceeds a minimum value. The height of the cloud center is taken as 1 meter with a vertical cloud sigma of 0.5 meter. The downwind and crosswind cloud sigmas are assigned values of 0.25 times their respective grid spacings.

In addition to evaporation of the droplets from the ground surface, an even more rapid process occurs. This process involves the liquid absorbing into the porous regions of the ground. The potential driving force for this absorption process is the diffusivity of the chemical agent through the porous structure. This driving force is multiplied by the difference between the level of liquid chemical agent when it has saturated the ground and the existing amount of chemical agent in the ground. For surfaces other than common ground cover, such as on vehicles or ships, the liquid would chemically adsorb rather than physically absorb.

The equations required for modelling adsorption would be identical to those for absorption but would require different diffusivity and saturation values. For deposition onto water, the liquid chemical agent will mix into the water at the surface, similar to absorbing into the ground. Although the water is not porous like the ground, an effective porosity can approximate the mixing process. Some chemical agents such as mustard will hydrolyze upon contact with water. This model does not treat hydrolysis or other chemical reactions.

After all of the droplets have either evaporated or absorbed into the ground cover, the process of desorption begins. Desorption is much slower than either droplet evaporation or absorption because mass transfer resistances now exist both in the ground and at the ground surface. The potential driving force is the combination of these mass transfer resistances:

$$K = \left(\frac{L}{Sh\,\delta_D} + \frac{\Delta z}{\delta_G}\right)^{-1}$$

where,

K=effective mass transfer coefficient

Δz=ground absorption layer thickness $\delta_G$=diffusivity of chemical agent through ground absorption layer. The attenuating factor for desorption is the same as for droplet evaporation from the ground—the difference between the chemical agent volatility and the chemical agent vapor concentration at the ground surface. Again, the chemical agent vapor concentration is the sum of contributions from all secondary vapor clouds at the grid point. The program assigns vapor generated by desorption to a new secondary vapor cloud if its concentration exceeds a minimum value.

At each time step, liquid persistence time is calculated as the difference between the current time and the deposition time at each grid point for all grid points having either droplets or absorbed liquid remaining. Secondary evaporation is a slower process than transport and diffusion, allowing larger time steps to be used. VLSTRACK uses one minute time steps. The program calculates secondary vapor dosage in mg-min/m$^3$ by summing each chemical agent vapor concentration at the grid point multiplied by the time step in minutes for each time interval. After dividing by the inhalation lethality, the secondary vapor dosage is added to the primary vapor dosage to obtain total vapor dosage in $LCT_{50}$'s. If a sampler has been designated, either the persistence time is recorded until the droplets have evaporated and absorbed liquid has desorbed, or the total vapor dosage is recorded as a function of time at the sample position. The downwind and crosswind positions and the downwind, crosswind, and vertical cloud sigmas for each secondary vapor cloud must also be updated for each time step. The program uses the same cloud expansion relations as used for the transport and diffusion phase.

After calculation of the liquid persistence and secondary vapor dosage, the computer program generates a grid output 270. The character graphics output consists of a graph title specifying the type of attack and type of output—deposition, persistence, or dosage—followed by a summary of the agent levels of interest. The graph contains the downwind coordinates along the bottom axis and the crosswind coordinates along the left side. The character graphic symbols represent the deposition, persistence, or dosage values equal to or exceeding the corresponding hazard level. If a sampler has been designated and is located on the grid, an "S" appears at its grid position, and the downwind and crosswind coordinates of the sampler are listed at the lower right corner. The program lists the duration of the attack in military time at the upper right corner. An initial wind direction vector located at a middle right side always runs across the columns and shows the direction of chemical/biological agent's transport for the initial time period. A prompt below the graph provides choices for continuing or terminating the run. The classification of the run, SECRET or UNCLASSIFIED, is printed at the upper left and lower right corners of the graph.

VLSTRACK writes the numerical values at each grid point to an output file VLSTRACK.GRD at the end of each run. The first line summarizes the starting grid position, grid spacing, and grid size, followed by the type of output, which is typically deposition, persistence, or dosage. The grid values are then printed out ten at a time in the downwind direction for each crosswind direction grid value. Each section represents an adjacent vertical slice of the representation of the character graphics. If all the sections were laid next to each other horizontally, the values would correspond to those represented on the graph.

The advantages and novel features of this invention include the ability to predict the dispersion of both biological and chemical munitions, the ability to read changing meteorological conditions, the capability of operating for both classified and unclassified agent and munition data files, and the simple operation on a personal computer. Because the method operates on a personal computer, which is easily transportable, the invention also enables greater flexibility and mobility of command posts during battlefield conditions. The method also gives better predictability of where the biological or chemical agent will disseminate. Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method of predicting the dispersion of a toxic munition having a toxic material for airborne release, comprising the steps of:

detecting the physical properties of the toxic material;

identifying a particular toxic agent;

detecting the physical properties of the munition;

reading meteorological conditions at the release location of the toxic munition;

initializing the detected physical properties of the toxic material, the detected physical properties of the toxic munition, and the read meteorological conditions as input signals for a central processing unit;

predicting transport and diffusion of the airborne toxic material through analysis of the physical properties of the toxic material and of the meteorological conditions including time of day, temperature, wind speed, wind direction, cloud cover, and air turbulence stability;

calculating deposition and primary dosage of the toxic material;

calculating liquid persistence and secondary vapor dosage of the toxic material; and representing graphically, using a two-dimensional hazard footprint, the predicted transport and diffusion, the calculated deposition and primary dosage, and the calculated liquid persistence and secondary vapor dosage on a display monitor of a personal computer.

2. A method of predicting the dispersion of a toxic munition having a toxic material for airborne release as recited in claim 1 further comprising repeating the steps of reading meteorological conditions and forecast, predicting transport and diffusion, calculating deposition and primary dosage, and calculating liquid persistence and secondary vapor dosage of the toxic material as desired to give an updated representation on the display monitor.

3. A method of predicting the dispersion of a toxic munition having a toxic material for airborne release as recited in claim 1 wherein said step of representing graphically includes a grid automatically sizes itself to contain the hazard by prediction of hazard size, output having downwind coordinates along a horizontal axis and crosswind coordinates along a vertical axis.

4. A method of predicting the dispersion of a toxic munition having a toxic material for airborne release as recited in claim 3 wherein the grid output includes representation of deposition, liquid persistence, and vapor dosage of the airborne toxic material.

* * * * *